United States Patent [19]
Blattenberger et al.

[11] Patent Number: 5,209,994
[45] Date of Patent: May 11, 1993

[54] LITHIUM-IODINE ELECTROCHEMICAL CELLS WITH IMPROVED END OF LIFE CHARACTERISTICS

[75] Inventors: David L. Blattenberger, Coon Rapids; William D. Helgeson, Minneapolis; John C. Strohkirch, Coon Rapids; Bernard Heller, Fridley, all of Minn.

[73] Assignee: Medtronic, Inc., Minneapolis, Minn.

[21] Appl. No.: 628,292

[22] Filed: Dec. 13, 1990

[51] Int. Cl.$^5$ .................. H01M 4/60; H01M 6/18; H01M 4/36
[52] U.S. Cl. .................. 429/213; 429/212; 429/101; 429/191
[58] Field of Search .............. 429/212, 213, 101, 191

[56] References Cited

U.S. PATENT DOCUMENTS

| | | | |
|---|---|---|---|
| 3,817,791 | 6/1974 | Greatbatch et al. | 429/101 |
| 3,944,433 | 3/1976 | Mead et al. | 136/83 |
| 3,957,533 | 5/1976 | Mead et al. | 429/213 |
| 4,071,662 | 1/1978 | Mead et al. | 429/178 |
| 4,182,798 | 1/1980 | Skarstad | 429/213 |
| 4,340,651 | 7/1982 | Howard et al. | 429/101 |
| 4,812,376 | 3/1989 | Rudolph | 429/101 |

FOREIGN PATENT DOCUMENTS 0049086  9/1981  European Pat. Off. .

OTHER PUBLICATIONS

Drawing of Catalyst Research Corporation Button Cell, identified as CRC RPM 1935.

*Primary Examiner*—Anthony McFarlane
*Assistant Examiner*—Nhat D. Phan
*Attorney, Agent, or Firm*—Daniel W. Latham; Harold R. Patton

[57] ABSTRACT

In lithium iodine electrochemical cells, control of polyvinylpyridine film thickness and/or polyvinylpyridine film surface area coverage and/or control of the quantity thereof on or with respect to the lithium anode operative surface directly affects cell voltage characteristics during discharge, allowing the tailoring of the voltage characteristics near cell end-of-life (EOL) in a useful way.

16 Claims, 4 Drawing Sheets

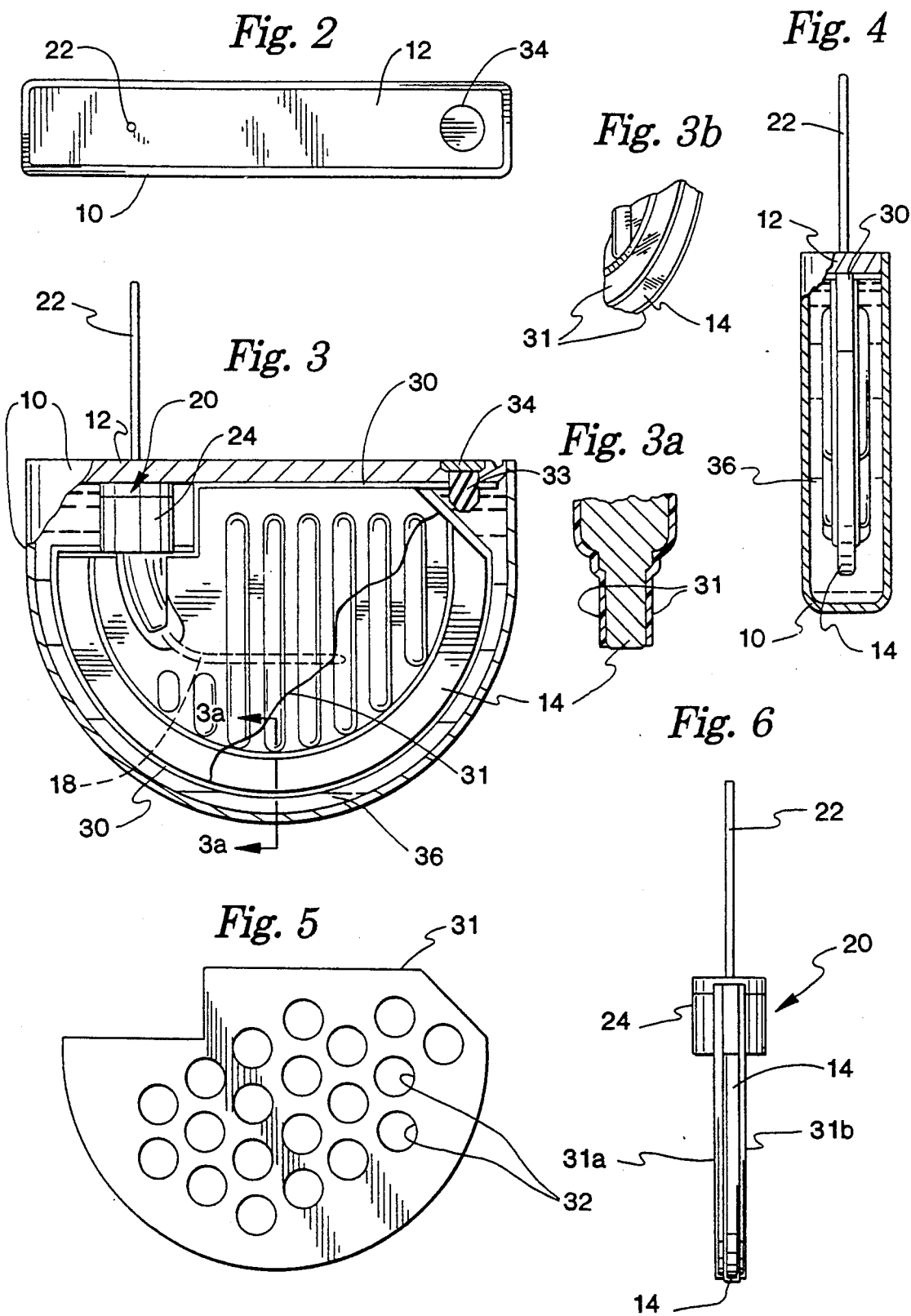

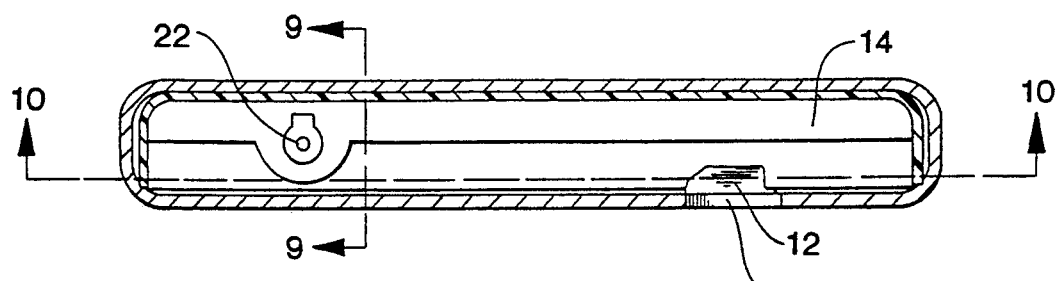
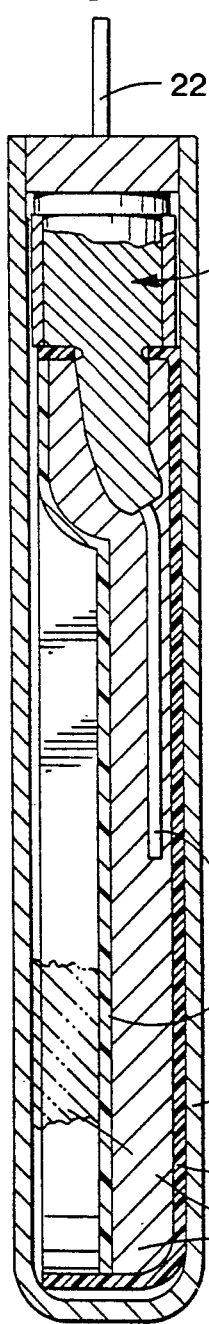
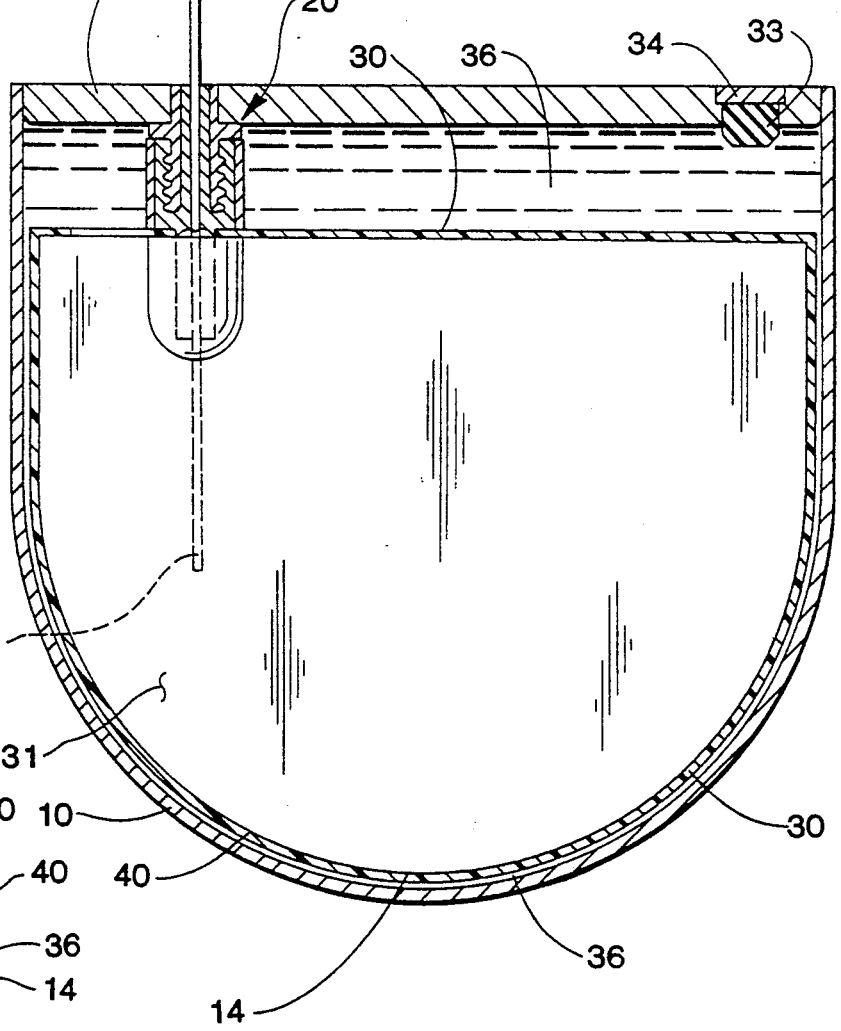

LITHIUM-IODINE ELECTROCHEMICAL CELLS WITH IMPROVED END OF LIFE CHARACTERISTICS

BACKGROUND

This invention relates specifically to lithium-iodine cells, including lithium anodes and an iodine-poly (2-vinylpyridine) complex cathode or similar cathode material. The operative surface(s) of the lithium anode is coated or otherwise covered with a layer of polymeric organic electron donor material such as poly (2-vinylpyridine), sometimes referred to as P2VP, other materials being known in the art. Briefly, the poly (2-vinylpyridine) or other polymeric organic donor material on the lithium anode may be applied by painting or otherwise depositing a coating of the polymer dissolved in tetrahydrofuran at room temperature. Such an arrangement is more fully described in U.S. Pat. Nos. 3,957,533 and 4,071,662, both to Mead, et al. Alternatively, a self-supporting film of polymeric organic donor material such as poly (2-vinylpyridine) may be placed over the operative anode surfaces. Such film is typically extruded. This is more fully described in U.S. Pat. No. 4,182,798 to Skarstad, assigned to the same assignee as this invention. The term "operative surface(s)" refers to those surface areas of the anode which are exposed in the cell to cathode material.

General teachings concerning cathode materials for lithium iodine cells may be found in U.S. Pat. No. 4,340,651 to Howard, et al. also assigned to the same assignee as this invention. As an example of cathode material, a mixture of iodine and poly (2-vinylpyridine) is heated at an elevated temperature for a time adequate to form a complex composition. The cathode material is then poured into a cell container into which a lithium anode having a coating or film of poly (2-vinylpyridine) thereon (a preferred polymeric organic donor material) has been previously positioned. The cell container is then hermetically sealed. Such cells, in a relatively thin form having a thin planar anode having, most often, two opposed major lateral surfaces, have found particular application in the medical field for heart pacemakers and other medical devices.

Lithium-iodine cells for medical applications have typically been case-positive with cathode material on two sides of a central lithium anode resulting in relatively highly efficient cells. Such cells are so efficient in discharge that they tend to exhaust most of the cell capacity before exhibiting rapid voltage decay at end-of-life (EOL).

SUMMARY OF THE INVENTION

In accordance with this invention, it has been discovered that the discharge performance characteristics of such cells can be changed through modification of cell construction such that the EOL behavior is tailored and enhanced so as to be more useful. That is, the maximum cell efficiency achieved for typical cells with centered anodes and typical P2VP film weights on the anode, which exhibit rapid voltage decay at end-of-life can be modified to provide increased time for elective replacement of the cell or the medical unit incorporating the cell, by flattening the voltage vs. time curve for such cells thereby extending and gradualizing end-of-life voltage. The more gradual end-of-life voltage decay of such improved or modified cells allows for more flexible EOL trigger voltages.

Thus, this invention makes possible a more gradual voltage decay at EOL in such cells.

For example, in a cell having a central anode, the poly (2-vinylpyridine) or other polymeric organic donor film or coating for the lithium anode may be perforated, punched, cut or in some way reduced in surface area on the lithium anode operative surface, as compared to what might normally be used i.e., less than the entire operative surface of the anode is covered or a mismatched weight is used. The coating coverage reduction on the anode typically may range between ten and sixty percent of the operative anode surface. Control of film thickness and film surface coverage of the lithium anode has been found to directly affect cell voltage characteristics during discharge, particularly at EOL. Although the desirable EOL characteristics are most preferably obtained by incorporating equal but reduced-from-normal quantities of perforated poly (2-vinylpyridine) film on opposite sides of a planar lithium anode, similar characteristics may also be obtained by incorporating 50–100 percent heavier poly (2-vinylpyridine) film on one side of the anode as compared to the other side. This mismatching of poly (2-vinylpyridine) film also produces a more resistive cell on discharge resulting in improved end-of-life voltage characteristics, that is more time between any two voltages at EOL.

The use of the preferred perforated P2VP film, film on half or on a portion of the anode or on only one side, has been found particularly useful in these respects. The reduction in quantities of P2VP is also combinable and useful with an off-center anode arrangement coated in the normal way but having only one side of the anode exposed to the cathode material.

According to this invention, it has been discovered that the shape of the cell discharge curve can be modified so as to flatten it toward the end portion thereof by controlling the quantity and/or arrangement of the polymeric donor material used on or in association (as by self-supporting films) with the operative surface(s) of the lithium anode.

BRIEF DESCRIPTION OF THE DRAWINGS

FIG. 2 is a top plan view of the present invention in a preferred form.

FIG. 3 is a front elevational view thereof with parts cut away.

FIG. 3a is a detail section thereof along line 3a—3a in FIG. 3.

FIG. 3b is a fragmentary perspective view thereof.

FIG. 4 is a side elevational view thereof with parts cut away.

FIG. 5 is a front elevational profile view of a perforated film used in the invention.

FIG. 6 is a side elevational view of an anode with anode films of differing thicknesses applied thereto.

FIG. 8 is a to plan view of an alternate form of invention with parts broken away.

FIG. 9 is a sectional elevation taken along line 9—9 in FIG. 8 with parts broken away.

FIG. 10 is a sectional elevation taken along line 10—10 in FIG. 8 with parts broken away.

DETAILED DESCRIPTION OF THE INVENTION AND ITS PREFERRED EMBODIMENTS

As already indicated, this invention relates to improvements in lithium iodine electrochemical cells. Such cells have found wide use in medical devices such as heart pacemakers as power sources. In such uses, it is common to monitor the cell during discharge and to select one or more voltage values as being indicative of the onset of cell exhaustion thus allowing time for elective replacement of the cell. This is typically done by means of electrical circuit means (not shown) arranged to act as a trigger device.

Figure 1:
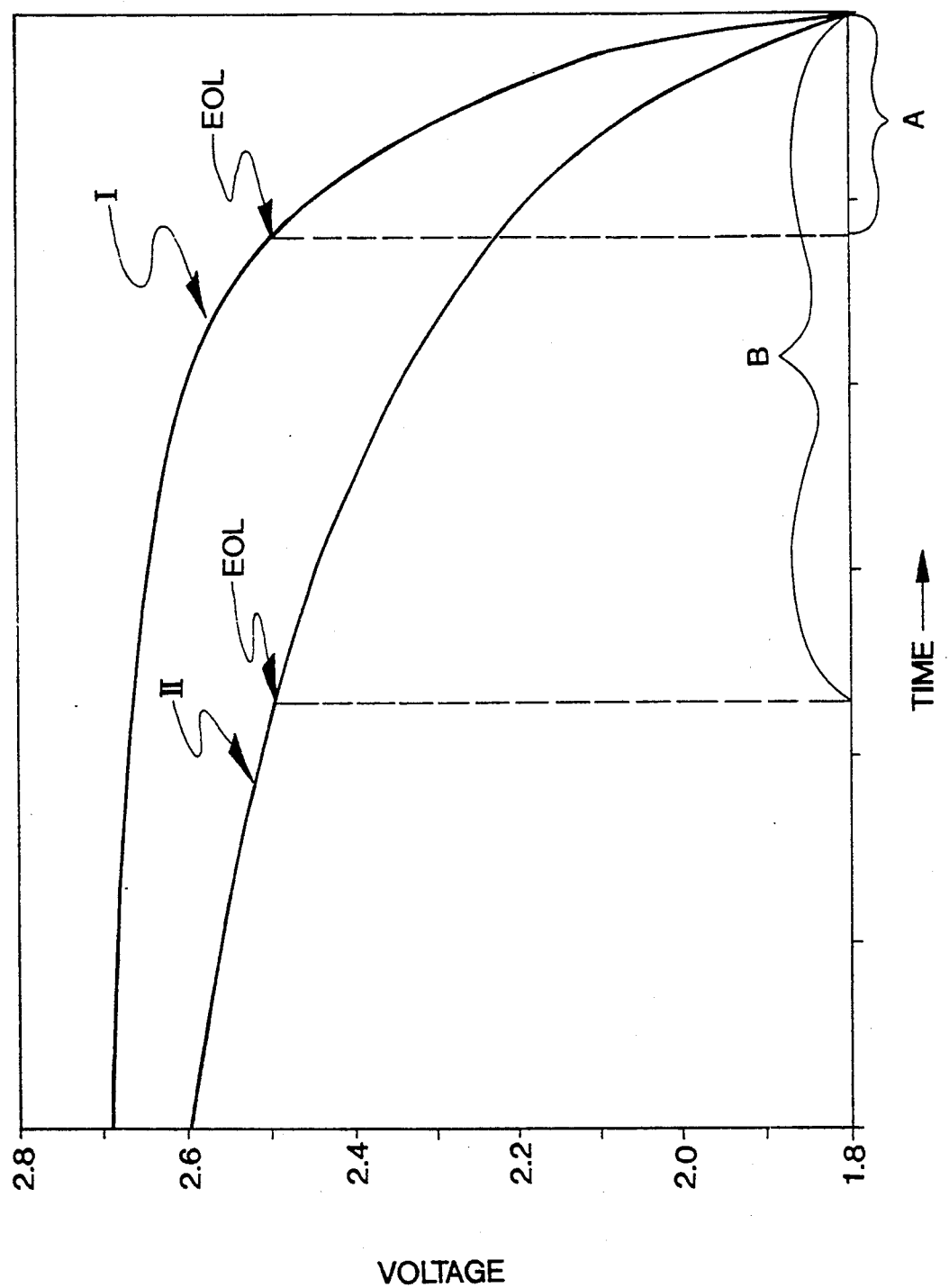
FIG. 1 is a graph comparing the voltage discharge of a typical prior art cell with one according to the invention.

Referring now to FIG. 1, the problem to which the invention is directed can best be understood with the aid of a graph. FIG. 1 is a graph showing a typical prior art highly efficient lithium cell discharge curve I over time in the end-of-life region (voltage v. time) and the discharge curve II for one form of the invention.

Curve I in the Figure, as already stated, shows the discharge of a highly efficient lithium iodine cell. It can be seen that most of the cell capacity is depleted with little voltage decay before a precipitous voltage drop occurs at the EOL (arbitrarily selected) point. This drop extends over a very short time period A, which can be extremely short, so short that not enough time may be conveniently available for elective replacement of the cell, according to present standards. On the other hand, a cell constructed according to the invention will have a discharge curve similar to curve II of FIG. 1 in which it can be seen the EOL extends over a much longer time period B.

This modification of the EOL discharge characteristics of lithium iodine cells is made possible by controlling the quantity and or arrangement of the polymeric donor material asociated with the anode so as to achieve a predetermined curve shape. For example, this can be achieved by the reduction of the P2VP film coating on the anode surfaces in conjunction with a decrease in concentration of the P2VP in the cathode material, i.e., using higher ratios of iodine: P2VP e.g. greater than 50:1. In its simplest form, the objective may be achieved by merely using lesser quantities of the donor material in association with the anode. Such modifications enhance EOL performance with marginal longevity reduction in cell capacity. For example, in one of the preferred embodiments of the invention, it has been determined that a 50% reduction in anode coverage i.e., only one half of the operative surface of the anode is covered by P2VP film, with a 1% decrease in cathode concentration of the P2VP will improve EOL performance greater than 100% with less than a 5% decrease in cell longevity.

Referring now to FIGS. 2–4, a hermetically sealed lithium-iodine cell is illustrated showing a preferred application of the invention in a "centered anode" form. The cell comprises a container 10 of metal such as stainless steel. Container 10 has a open top or end which is closed by means of a lid 12, also of stainless steel, which is welded to container 10. The cell further includes anode means comprising a lithium element 14 having an embedded anode current collector. Current collector 18 may be an extension of lead 22 as shown and may be a thin pin of nickel or stainless steel. Lithium element 14 maybe formed from two lithium halves which are pressed together with the collector 18 therebetween. Electrical lead 22 is of sufficient length to extend out of container 10 for making an external electrical connection thereto. Conductor 22 is sealed from the remainder of the cell contents by means including an insulator element generally designated 24 which surrounds lead 22. Insulator 24 is of an materials which in addition to being non-conductors of electricity are also non-reactive with the contents of the cell and may include glass and plastic as is known in the art. Many other non-reactive materials may be used for insulator 24.

The anode assembly comprising lithium element 14 and current collector 18 is preferably fitted within an anode holding or retention means comprised of a peripheral member in the form of a plastic band 30 which peripherally encloses the anode assembly leaving the two opposite major lateral surface areas of the planar lithium element exposed. Band 30 is preferably of the aforementioned fluorpolymer material or any similar material which is nonactive with the cell contents. In the present illustration, lithium element 14 maybe of a sandwich-like construction in which two pieces are brought together with collector 18 therebetween. Band 30 surrounds the peripheral edge of lithium element 14 engaging the peripheral contacting surfaces provided at the joint area formed between the lithium pieces. The opposite ends of band 30 are provided with apertures of a size sufficient to receive a portion of insulator 24. These ends are overlapped adjacent the insulator as shown in FIG. 3 to provide a wrap-around structure. As aforenoted, the anode is provided with a poly(2-vinylpyridine) coating or film, the most preferred polymeric organic donor material covering, as is known in the art, before being positioned in container 10. As can be seen in FIG. 5, the poly (2-vinylpyridine) material most preferably takes the form of perforated film 31 covering the lateral operative surface areas of anode 14. As is known in the art, see U.S. Pat. No. 3,957,533 for example, other donor materials may be used on both the anode and in the cathode material. As shown in FIG. 4 the anode 14 is then positioned in container 10 with the opposed lateral anode operative surfaces spaced from the inner surface of the container. Plastic clips (not shown) may be used for this positioning if desired and the plastic band may be omitted. Lid 12 is then welded to container 10.

In the particular embodiment illustrated, container 10, being of electrically conductive material, serves a cathode current collector in direct contact with the cathodic contents of container 10. Consequently, an electrical lead (not shown) may be attached directly to the exterior of container 10 for cathodic contact.

As is already known and typical, the iodine cathode material 36 is poured through a suitable filler opening in lid 12 to fill container 10 and operatively contact the exposed surfaces of the lithium anode. The amount of cathodic material 36 introduced into the container is preferably sufficient to contact the lateral surfaces of lithium element 14 and to reach a level at or adjacent the interior surface of lid 12. The opening in lid 12 is then hermetically sealed with a series of closure members or plugs such as an inner Teflon plug 33 and an outer stainless steel plug 34.

In accordance with the invention and as shown in the drawing Figures, particularly FIG. 3 and FIG. 5, the poly (2-vinylpyridine) or other polymeric organic donor covering the lithium anode 14 is preferably in the form of an extruded film which has been perforated to reduce it in quantity. The same film weight and number of perforations 32 thereon may be utilized on both sides of lithium anode 14. It has been found that such an arrangement when compared to the typical film covered lithium anode i.e., completely covered, provides a more gently sloping EOL voltage curve for the cell that is obtained in an identical cell in which the anode is fully covered with P2VP. In any given cell construction, size and material used, more or less perforations may be used and this will have to be determined for each set of specific circumstances and the EOL characteristics desired.

Table I included below compares "centered anode" constructions, with a typical film weight of approximately 36-40 milligrams vs. identical constructions, having light weight of approximately 17-20 milligrams and shows that the time between a trigger EOL voltage of 2.45 and a second later voltage of 1.80 is much greater for those cells having the light films than for those having the normal heavier film weight.

P2VP film, the balance exposed through the perforations [⅛" holes] in the film); "1-sided" cells (film is on one side only of the anode); "½ both" cells (½ of each side of the anode is covered with film); "painted" cells (in which, according to the prior art, the entire working surface of the anode is coated with a layer of P2VP dissolved in tetrahydrofuran and painted on the anode with a brush); and "no film" cells (anode uncoated i.e, completely exposed). Samples were prepared at 20:1, 50:1 and 100:1 for the cathode material i.e., iodine: P2VP ratios.

In the Table:

"% UTILIZED" means deliverable cathode capacity divided by cathode capacity expressed in %.

"DELIVERED Q" means delivered capacity expressed in milliamps hours.

"EOL DAYS 2.45-1.8" means the length of end-of-life measured between 2.45 volts and 1.8 volts at 22 microamps and expressed in days.

TABLE II

| CATHODE | PARAMETER | | CONTROL | PERFORATED | 1-SIDED | ½ BOTH | PAINTED | NO FILM |
|---|---|---|---|---|---|---|---|---|
| | PERFORMANCE SUMMARY 100 - 22 MICROAMP TEST | | | | | | | |
| 20:1 | % UTILIZED | χ | 89.2% | 71.8% | 79.6% | 63.5% | NA | 65.1% |
| | | σ | 0.7% | 1.7% | 0.7% | 3.6% | NA | 1.8% |
| | | n | 6 | 6 | 4 | 5 | NA | 5 |
| | DEL'VD. Q | χ | 853 | 699 | 744 | 621 | NA | 638 |
| | EOL DAYS 2.45-1.8 | χ | 152 | 153 | 263 | 164 | NA | 452 |
| | | σ | 9 | 13 | 24 | 17 | NA | 27 |
| | | n | 6 | 6 | 4 | 5 | NA | 5 |
| 50:1 | % UTILIZED | χ | 93.8% | 81.3% | 79.1% | 60.4% | 89.6% | 30.0% |
| | | σ | 0.5% | 3.9% | 0.6% | 3.1% | 1.0% | 1.6% |
| | | n | 4 | 4 | 4 | 4 | 4 | 4 |
| | DEL'VD. Q | χ | 1115 | 981 | 942 | 710 | 1072 | 365 |
| | EOL DAYS 2.45-1.8 | χ | 188 | 261 | 483 | 215 | 142 | 261 |
| | | σ | 24 | 29 | 25 | 33 | 24 | 21 |
| | | n | 4 | 4 | 4 | 4 | 4 | 4 |
| 100:1 | % UTILIZED | χ | 96.0% | 93.9% | 80.8% | 62.3% | 93.3% | 21.4% |
| | | σ | 0.4% | 1.7% | 0.6% | 2.2% | 0.5% | 0.5% |
| | | n | 4 | 4 | 4 | 4 | 4 | 4 |
| | DEL'VD. Q | χ | 1197 | 1179 | 1009 | 792 | 1156 | 274 |
| | EOL DAYS 2.45-1.8 | χ | 181 | 367 | 667 | 309 | 205 | 192 |
| | | σ | 14 | 29 | 44 | 37 | 57 | 5 |
| | | n | 4 | 4 | 4 | 4 | 4 | 4 |

TABLE I

| Anode Type | P2VP Weight | Months 2.45-1.80 V |
|---|---|---|
| Centered | Normal | 4 |
| Centered | Normal (Mismatch) | 5 |
| Centered | Light (Perforated) | 9 |
| Centered | Light (Mismatched) | 12 |
| Centered | Light (One-sided) | 14 |

In the test cells for Table I, the perforations were ⅛" in diameter and distributed as shown in FIG. 5, which shows a piece of perforated extruded film. Size and distribution of the perforations is not critical and the arrangement described was used because of convenience. There is thus provided a gentle slope in the voltage vs. time characteristics of a cell constructed in accordance with the invention whereby, at a trigger voltage of 2.45 volts, for example, increased time for elective replacement is provided.

Referring now to Table II below, a collection of comparative data is included for: "control" cells (P2VP film over both sides of anode); "perforated" cells (having 50% of the anode surface covered with perforated The data in Table II shows that an improved balance in the whole picture of cell performance can be obtained in accordance with this invention. The whole picture of cell performance involves not merely maximizing the delivered capacity. Instead, an optimization between cell longevity and the elective replacement duration is required in cell performance for a power source to be used in medical devices, such as implantable pacemakers and the like. This trade-off between maximizing cell capacity and maximizing the duration of voltage decay in the elective replacement region can be controlled usefully in accordance with this invention.

Instead of including perforated film, similar results may be readily attained by utilizing thicker coating or layers on one side of the centered anode than on the other (mismatch). This is illustrated schematically on the modified anode construction shown in FIG. 6 wherein film 31a covers one entire surface of lithium anode 14 but is thicker than film 31b of similar surface area on the opposite planar surface of the anode.

Figure 7:
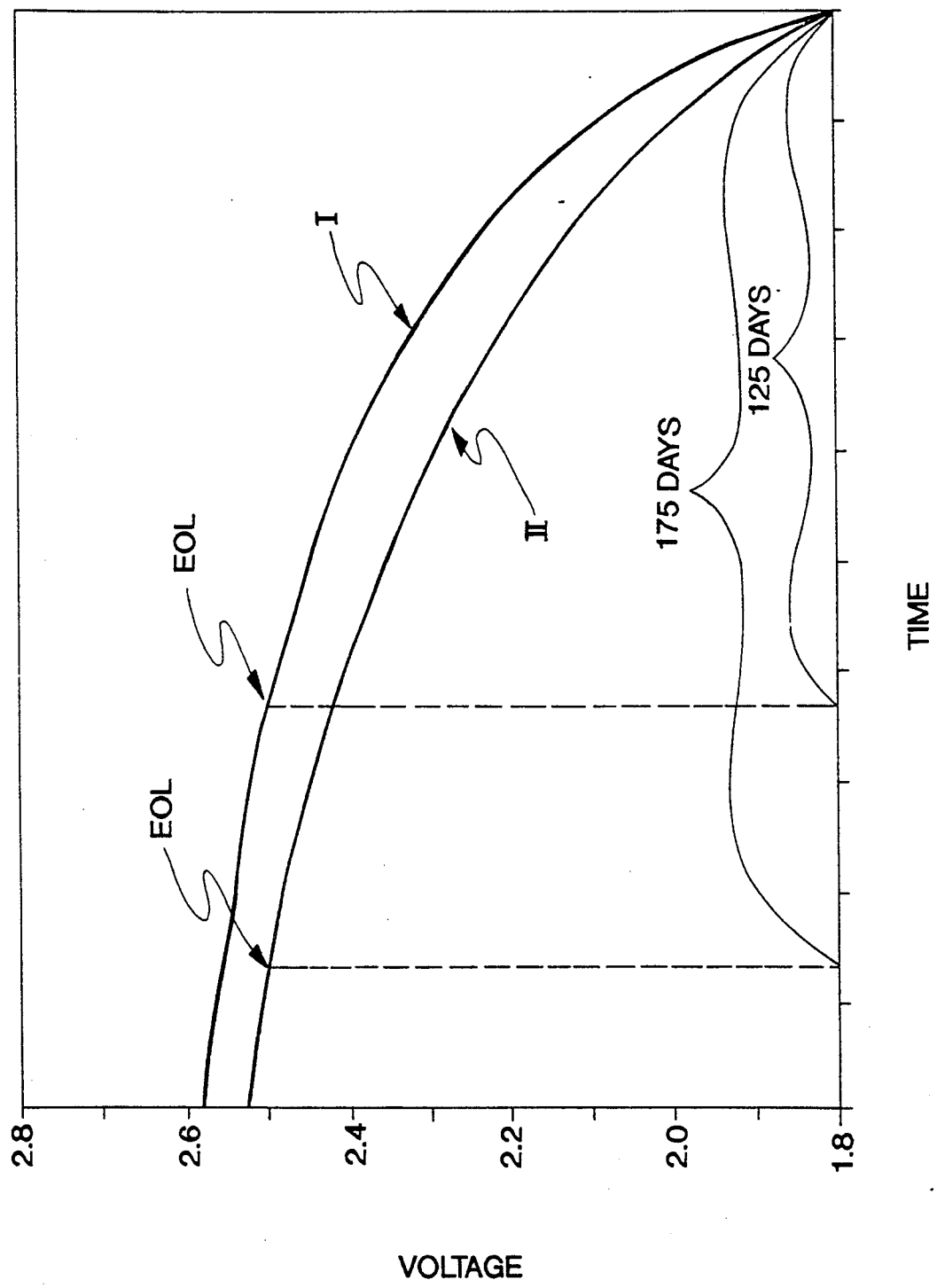
FIG. 7 is a graph of capacity vs voltage for matched and mismatched P2VP Films.

Comparison between similar cells of similar construction containing matched (curve I) and mismatched (curve II) P2VP films on the lithium anodes thereof can be seen in the Graph of FIG. 7, showing the extended EOL characteristics which can typically be obtained from the previous constructions, i.e. 125 days compared to 175 days.

Referring now to FIGS. 8-10, there is shown what is referred to herein as an "off-center" anode construction in which exposed anode surface on one side of the anode only might typically be on the order of 3.3 square centimeters, for example, as compared to a centered anode of similar construction and size wherein approximately 5.9 square centimeters of anode surface might be exposed in the container. In the arrangement shown in FIGS. 8-10, the anode 14 is placed in a Halar ® cup 40 and positioned against one side of the container 10 as shown. Solid or perforated P2VP film 31, (perforated being most preferred) is placed on the exposed side of lithium anode 14. When comparing the EOL characteristics of such a cell to a control cell having a centered anode with similar weight P2VP on both exposed sides of the lithium anode to a cell of the type shown in FIGS. 8-10 having the off-centered configuration with a similar weight perforated film on one side only of a similar size anode, electrical characteristics as to EOL are gradualized similar to those discussed previously hereinabove by controlling the quantity of coating and/or operative anode surface area covered and uncovered as described hereinabove, for the "centered anode".

Data taken from discharge curves with respect to an offset anode having a P2VP overcoat on the side exposed to the cathode material, as compared to similar cells in which the anode is centered and both sides have a P2VP overcoat, show that the off-set configuration particularly exhibits enhanced EOL for cells having higher iodine:P2VP ratios, greater than 50:1, while providing adequate capacity for medical device usage.

The modifications of the present invention provide a more gradual EOL voltage decay from a selected trigger voltage (2.5 volts for example), extending the elective replacement time from approximately 4 months to approximately 12 months.

It will be clear to those familiar with this art that, for any particular control in any specific cell construction and design, some minor adjustment may be required to arrive at the particular decreased amounts of organic covering material which will be effective in providing any desired modification in EOL for the particular cell involved.

While preferred embodiments have been described in detail, this has not been done for purposes of limitation but by way of illustration. The invention is intended to be defined by the following claims:

What is claimed is:

1. An electrochemical cell comprising a lithium anode and an iodine-containing cathode, the lithium anode having a first operative portion and a second operative portion, said first operative portion having a weight of polymeric organic donor material thereon and said second operative portion having a lesser weight of polymeric organic donor material thereon, whereby desirable end-of-life characteristics are provided.

2. The electrochemical cell of claim 1 wherein the anode has a substantially flat configuration with a first anode face and a second, oppositely directed, anode face and wherein the organic donor material is in film form on both the first anode face and second anode face.

3. The electrochemical cell of claim 2 wherein perforation in the film determines the weight of donor material on the second operative portion of the anode.

4. The electrochemical cell of claim 3 wherein the second operative portion of the anode is substantially equally distributed between the first and second anode faces.

5. The electrochemical cell of claim 3 wherein the second operative portion of the anode is unequally distributed between the first and second anode faces.

6. The electrochemical cell of claim 2 wherein the film on the first anode face is thicker than the film on the second anode face.

7. The electrochemical cell of claim 6 wherein the thickness of donor material on the first operative portion of the anode is about 50% to about 100% greater than the thickness of the donor material on the second operative portion of the anode.

8. The electrochemical cell of claim 5 wherein the second anode face is substantially free of donor material.

9. The electrochemical cell of claim 2 wherein the ratio of the first operative portion of the anode to the second operative portion of the anode is about 1:1.

10. The electrochemical cell of claim 1 wherein the anode has a substantially flat configuration with a first anode face and a second, oppositely directed, anode face, wherein the first anode face is not an operative portion of the cell, and wherein the cathode contains polymeric organic donor material at a ratio of iodine to donor material of greater than 50:1.

11. The electrochemical cell of claim 10 wherein the first anode face is covered with a barrier material, whereby the cathode does not contact the first anode face.

12. The electrochemical cell of claim 11 wherein the first anode face is insulated and placed against a side of the cell.

13. A method for modifying the end-of-life characteristics of an electrochemical cell having a lithium anode and a iodine-containing cathode by the steps comprising:
applying to a first operative portion of the anode a weight of polymeric organic donor material;
applying to a second operative portion of the anode a second, lesser weight of polymeric organic donor material.

14. The method of claim 13 wherein the polymeric organic donor material is applied as a film.

15. The method of claim 13 wherein the greater weight of the donor material on the first operative portion of the anode is provided by perforating the donor material over the second operative portion of the anode.

16. The method of claim 13 wherein the greater weight of the donor material on the first operative portion of the anode is provided by applying a greater thickness of the donor material on the first operative portion of the anode.

* * * * *